United States Patent [19]

Ryan

[11] 3,960,523
[45] June 1, 1976

[54] EFFLUENT GAS MONITOR

[75] Inventor: James R. Ryan, New Kensington, Pa.

[73] Assignee: Aluminum Company of America, Pittsburgh, Pa.

[22] Filed: Apr. 21, 1975

[21] Appl. No.: 570,271

[52] U.S. Cl. ............................. 55/84; 55/227; 55/270; 73/61 R
[51] Int. Cl.² ............................. B01D 47/06
[58] Field of Search ................... 55/84, 85, 94, 173, 55/227, 229, 270, 274; 73/28, 61 R; 210/96

[56] References Cited
UNITED STATES PATENTS

| 2,242,294 | 5/1941 | Fox et al. | 55/85 |
| 3,334,516 | 8/1967 | Cedrone | 210/96 X |
| 3,668,825 | 6/1972 | McIlvaine | 73/28 X |
| 3,772,851 | 11/1973 | Duffey | 55/270 X |
| 3,811,249 | 5/1974 | Arnold et al. | 55/84 |
| 3,834,128 | 9/1974 | Gardiner | 55/229 X |

*Primary Examiner*—John Adee
*Attorney, Agent, or Firm*—Andrew Alexander

[57] ABSTRACT

An apparatus and method for monitoring an effluent-bearing gas. The apparatus has a main chamber to which effluent-bearing gas and vaporized liquid are introduced for removing contaminants from the gas by the vaporized liquid. The main chamber has an exit for removing processed gas and a liquid reservoir for receiving condensed liquid from the main chamber. The liquid reservoir has a liquid removal system and a liquid level control. Liquid may be introduced directly into the main chamber or to the reservoir. In operation of the apparatus, effluent-bearing gas is admitted to the main chamber where it is contacted with vaporized liquid and then discharged. The vaporized liquid is condensed and introduced into the reservoir, from which a portion of the liquid may be removed and analyzed for gaseous borne effluent.

8 Claims, 2 Drawing Figures

EFFLUENT GAS MONITOR

BACKGROUND OF THE INVENTION

This invention relates to sampling effluent gas for contaminants and in particular to an apparatus and method capable of continuous sampling of effluent-bearing gas for the presence of contaminants.

A common practice to obtain an indication of the amount of contaminant in a gas is to pass a given volume of the gas through a given volume of liquid and subsequently determine, by chemical analysis, the amount of contaminant collected in the liquid. However, this practice is not always satisfactory because the value obtained on analysis represents only an average value for the period in which the gas was passed through the liquid. Such an average value may appear satisfactory when in reality the average contamination — over a longer period — is higher. For example, if in the sampling time period for which the gas is passed through the liquid, the contaminant level is substantially negligible, a low reading will be obtained. But if in a very short period thereafter the contaminant level becomes very high, the previous reading is obsolete — or at the least misleading. Also, there is nothing to relate the sampling period with industrial activity.

This prior art method has the additional disadvantage that often there can be a considerable delay between the time the sample is taken and the time when it is analyzed. This last disadvantage can have very serious consequences. For instance, in an industrial operation which has an effluent cleaning or processing system, it is imperative to know when the system is operating satisfactorily. If samples are taken, and analyzed later, and the effluent cleaning system has in the meantime broken down, considerable undesirable pollutants or contaminants may have escaped into the atmosphere. The present invention has overcome all of these disadvantages by being capable of continuously monitoring stack emissions and giving an almost instantaneous analysis of pollutants therein.

SUMMARY OF THE INVENTION

The present invention provides a novel apparatus and method for sampling and processing effluent-bearing gas for contaminant detection. The apparatus has a main chamber having means for introducing gas and means for introducing vaporized liquid thereto. The main chamber has also a means for discharging processed gas, means for condensing contaminant containing vaporized liquid mixture, and a liquid reservoir for receiving the condensed liquid mixture. The liquid reservoir has a liquid withdrawing means and a liquid level control. A means is provided for supplying fresh liquid to the main chamber and/or the reservoir.

In operation of the apparatus, effluent-bearing gas is admitted to the main chamber where it is contacted with vaporized liquid which removes the effluent. The gas is then discharged from the chamber. The vaporized liquid is condensed and introduced to the reservoir from which a portion of the liquid is removed and analyzed for gaseous borne effluent. Concurrently, liquid is supplied to the main chamber and/or the reservoir.

OBJECTS

An object of this invention is to provide a method and apparatus capable of continuously monitoring effluent gases.

Another object of this invention is to provide a method and apparatus capable of detecting a large range of contaminants in effluent gases.

A further object of this invention is to provide a method and apparatus capable of accurately measuring very small or large amounts of contaminants in effluent gases.

These, as well as other objects, will become apparent in the discussion that follows.

DETAILED DESCRIPTION OF THE PREFERRED EMBODIMENTS

Figure 1:
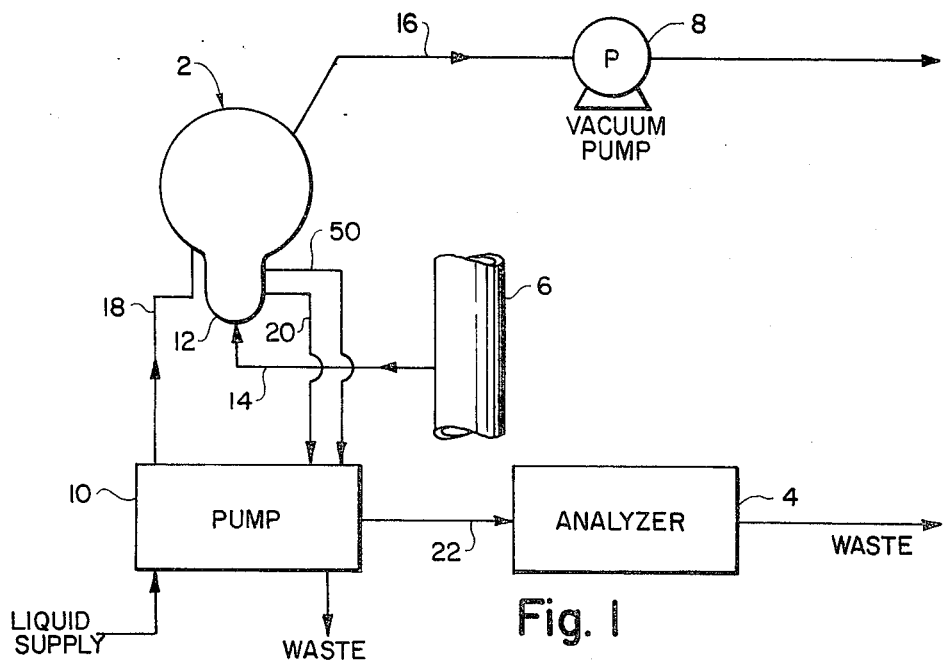
FIG. 1 is a diagrammatic view of an embodiment of the invention.

Referring now more specifically to FIG. 1, there is shown a gas monitoring apparatus comprising an effluent-bearing gas processing or scrubbing chamber, generally indicated as 2, a vacuum pump 8, a liquid pump 10, and an analyzer 4. The vacuum pump 8 is connected to chamber 2 by line 16 and, as a result, draws gas from stack 6 along line 14 and through chamber 2 where it is processed or scrubbed clean of effluent. After processing or scrubbing, the gas is discharged along line 16 through vacuum pump 8. The scrubbing fluid is introduced to chamber 2 through line 18 by pump 10 from a liquid supply and collects in reservoir 12 of chamber 2 with liquid which had been vaporized into chamber 2 for scrubbing and condensed back into reservoir 12. Liquid is drawn from reservoir 12 along line 20 by pump 10 and passed along line 22 to analyzer 4 which provides a reading of the amount of contaminant present in the stack gases which may be in the form of a printout. An overflow 50 is provided to maintain a substantially constant volume in reservoir 12. The overflow is operated by pump 10 which withdraws excess liquid from reservoir 12 along line 24 to be discarded.

Analyzer 4 may be a conventional sensing electrode type analyzer well known to those skilled in the art and which forms no part of this invention per se. Illustrative of such analyzers is the Series 1000 monitor available from Orion Research, Inc. of Cambridge, Mass. and is more fully described in their publications such as Orion Research Newsletter, Volume V, Number 1.

Figure 2:
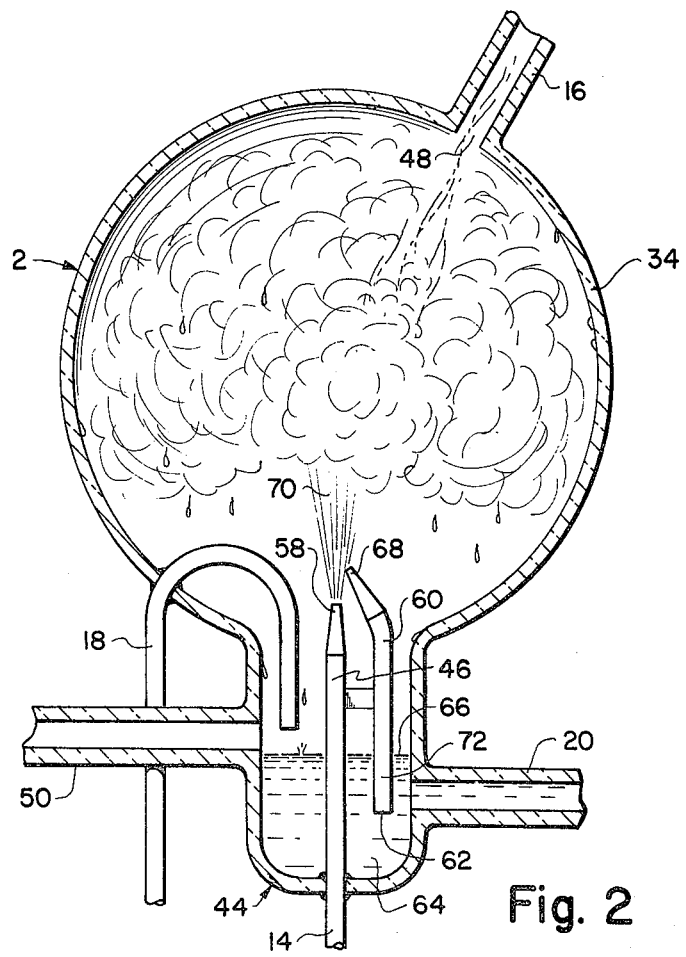
FIG. 2 is a partially schematic cross-sectional illustration showing an embodiment of the invention.

Referring to FIG. 2, there is shown an embodiment of a main chamber for scrubbing, generally referred to as 2, in accordance with this invention. The chamber comprises a wall 34, in this instance of generally spherical configuration. The chamber 2 preferably has a volume of about 50 to 1000 ml although there may be instances when it is advantageous to depart from this range. Preferably the wall is made of glass, but any material resistant to stack gases may be used. Chamber 2 is provided with reservoir 44, a stack gas inlet 14, and a processed gas outlet 48 to the vacuum pump. Reservoir 44 is located so as to collect liquid from main chamber 2 usually by condensation on wall 34 and gravity flow to the reservoir. Preferably, the chamber is shaped to permit flow of condensate from its walls into the reservoir. Scrubbing liquid is provided to chamber 2 through line 18 and subsequently is collected in reservoir 44. Typical flow rates to chamber 2 are about 0.5 to 3 ml/min. A constant volume of scrubbing liquid is maintained in reservoir 44 by any suitable means, in this instance an overflow 50. The reservoir 44 is provided with a means for atomizing or vaporizing (to be described in more detail hereinafter) scrubbing liquid from the reservoir to the scrubbing chamber 2. Additionally, reservoir 44 is provided with outlet 20 which conveys scrubbing liquid towards the analyzer 4. Preferably the rate of flow of fresh scrubbing liquid is at least equal to the rate of flow from chamber 2 and reservoir 44. However, if desired, the flow rate may be greater than the flow rate to the analyzer. Excess liquid is removed by overflow 50 which ensures a constant volume in the reservoir.

Describing the atomizing structure in more detail, it will be observed that stack gas inlet 14 has an extension 46 projecting above the level of the scrubbing liquid 64 in reservoir 44. Extension 46 converges to opening or orifice 58 in the form shown. Positioned adjacent the gas inlet extension 46 is conduit 60 which has a lower cylindrical portion 72 which has an inlet opening 62 located in the reservoir liquid 64. Outlet 68 of conduit 60 is positioned to cooperate with incoming stack gas 70 to draw liquid 64 from reservoir 44 through tube 60 into stack gas 70 where it is expanded and is dispersed or atomized into a fine mist or vapor. The flow of gas as well as dispersing or atomizing the scrubbing liquid also provides mixing action within the scrubbing chamber, which action thoroughly contacts the stack gas with the fine mist particles which absorb the contaminants. A portion of the mist or vapor then condenses on the wall 34 of chamber 2 and flows by gravity to reservoir 44. Because of the action of vaporization and condensation, the liquid in the reservoir is thoroughly mixed with the condensed liquid and the new liquid being added ensuring uniform concentration in the reservoir. A continuous flow of reservoir liquid is preferably maintained to the analyzer which provides a continuous analysis of contaminants in the stack gas.

Preferably, the scrubbing liquid is deionized water. However, various liquids may be used depending largely on the contaminant that is to be removed from the stack gas. It has been found that deionized water efficiently removes chlorides and fluorides.

In this invention, the size of the reservoir is important. Preferably, the volume of the reservoir is relatively small. That is, the volume of the reservoir preferably is about 2 to 3 milliliters. However, it should be understood that the reservoir may be about 0.25 ml or even smaller or may be about 100 ml or larger. The small reservoir has the advantage that it is more sensitive to changing concentration of contaminants, which sensitivity is conveniently reflected on the readout chart of the analyzer. However, larger volumes such as 100 ml can be used if periodic readings are required as in the batch type operation. A small reservoir is advantageous when a continuous analysis is required, because the small amount of liquid will be more sensitive to changes of contaminant concentration in the stack gas and also the time lapse for analysis is relatively small.

In the present invention, the time lapse from drawing the sample to producing the analysis is typically about 1 minute. Thus, analytical readings are obtained which can be closely associated with plant activity.

An advantage of having a continuous analytical readout closely associated with plant activity is that an alarm system may be set up to cooperate with the readout chart. For instance, an alarm may be set to go off, for example, when the concentration of a contaminant exceeds a given level and thus attention is directed more or less immediately to the fact that stack gas scrubbers or the like are not operating as required. Or in the alternative, alteration may be made in the manufacturing process, as by computers.

The flow rate of stack gas through the scrubbing chamber should be calibrated in order that it is efficiently cleaned by the scrubbing. It has been found advantageous to be able to vary the stack gas flow rate after the liquid flow rates have been set. Such adjustment may be made by changing the size of orifice 58 of gas inlet protrusion 46. Typically, flow rates are about 0.03 to 0.3 ft.$^3$/min.

It will be understood that the concentration of contaminant determined by the analyzer 4, refers to such concentration in liquid and must be converted to refer to gas in the stack. The conversion may be made by the following formula to provide micrograms of fluoride, for example, per cubic foot of stack gas:

$$\left[\left(\frac{\text{deionized water flow rate to chamber} - \text{evaporation loss}}{\text{stack gas flow rate to chamber}}\right) \text{reading from analyzer}\right]\left(1 + \frac{1}{\text{efficiency}}\right)$$

= fluoride in micrograms per cubic foot of stack gas where:
the deionized water flow rate to chamber is in ml/min.
the evaporation loss is in ml/min.
the stack gas flow rate to chamber is ft.$^3$/min.
the reading from the analyzer is in micrograms of fluoride.
the efficiency is a calibration factor.

The efficiency may be determined by monitoring the contaminant contained in the scrubbed stack gas or it may be determined by comparing the amount of contaminant scrubbed from a known concentration.

EXAMPLE

To further illustrate the operation of the invention, a stack gas having a small amount of fluoride was flowed through a scrubbing chamber having a volume of approximately 200 cubic centimeters at 0.1248 cubic feet per minute through an orifice 58 having a diameter of approximately 0.03 centimeters. Deionized water was pumped to the chamber at 2.5083 ml/min. The water loss by evaporation was determined to be 0.175 ml/min. and the chamber had been previously determined to have a 94.77% scrubbing efficiency. The analyzer indicated a reading of 1.6 ppm fluoride. By using the above formula, the concentration of fluoride in the stack gas was calculated to be 30.56 micrograms per cubic foot of stack gas. At the same time, for the same time period, a sample of the same stack gas was taken by the prior art batch system and chemically analyzed and found to contain 30.81 micrograms of fluoride per cubic foot of stack gas.

It will be understood that while deionized water was used to scrub or remove contaminants from the stack gas any liquid which effectively removes the contaminant may be used. For instance, it may be desirable to use certain liquids to selectively remove certain contaminants. Also, while the example was described in terms of fluoride, the invention is not limited thereto. For instance, the invention may be used to remove from stack gases effluent such as chlorides, cyanides, ammonia and sulfides. Furthermore, the invention can be used to monitor atmospheric pollutants such as oxides of nitrogen as well as stack gases.

While for purposes of illustrating the best mode of my invention emphasis has been placed in the disclosure upon the preferred and highly advantageous continuous process, it will be appreciated that the present invention can be used in the batch method where such use may be deemed advantageous.

While the invention has been described in terms of preferred embodiments, the claims appended hereto are intended to encompass all embodiments which fall within the spirit of the invention.

Having thus described the invention and certain embodiments thereof, what is claimed is:

1. An apparatus for removing effluent from an effluent-bearing gas comprising:
   a generally spherical main chamber having an effluent-bearing gas inlet for introducing said gas into said main chamber,
   a reservoir in communication with said main chamber for providing vaporized liquid to said main chamber and for receiving condensed liquid from said main chamber,
   a conduit having an inlet in said reservoir and an outlet adjacent said gas inlet for drawing liquid from said reservoir and vaporizing said liquid into said effluent-bearing gas by action of said gas passing from said gas inlet,
   said main chamber having means for removing processed gas from said main chamber,
   liquid supply means for providing liquid to at least one of said main chamber and said reservoir, and
   means for withdrawing liquid from said reservoir.

2. The apparatus of claim 1 wherein the main chamber volume is about 50 to 1000 ml.

3. The apparatus of claim 1 wherein the reservoir volume is about 0.25 to 100 ml.

4. A method for determining the concentration of effluent in an effluent-bearing gas comprising:
   providing a generally spherical main chamber and a reservoir in communication therewith,
   introducing said gas to said main chamber through a gas inlet in said main chamber,
   providing liquid to at least one of said main chamber and said reservoir,
   introducing vaporized liquid from said reservoir to said main chamber through a conduit having an inlet in said liquid in said reservoir and an outlet located adjacent said gas inlet so that said gas draws said liquid through said conduit into said gas whereby said liquid is vaporized in said gas thereby contacting said gas to remove effluent,
   removing said gas after contacting from said main chamber,
   removing condensed liquid from said main chamber to said reservoir,
   controlling the liquid level in said reservoir, and
   withdrawing liquid from said reservoir for analysis.

5. The method of claim 4 including introducing said gas at about 0.03 ft.$^3$/min. to 0.3 ft.$^3$/min.

6. The method of claim 4 including providing liquid to at least one of said main chamber and said reservoir at a rate about 0.5 to 3 ml/min.

7. An apparatus for removing effluent from an effluent-bearing gas comprising:
   a generally spherical main chamber having a volume of about 50 to 1000 ml and an effluent-bearing gas inlet,
   a reservoir suitable for receiving condensed liquid from said main chamber and having a volume of about 0.25 to 100 ml, said reservoir adapted to provide liquid to said main chamber,
   a conduit having an inlet in said reservoir and an outlet adjacent said gas inlet for drawing liquid from said reservoir and vaporizing said liquid into said effluent-bearing gas by action of said gas passing from said gas inlet,
   a liquid level control for said reservoir to maintain a liquid volume therein in the range of said 0.25 to 100 ml,
   a liquid supply means for providing liquid to at least one of said main chamber and said reservoir at a rate of about 0.5 to 3 ml/min.,
   means for removing processed gas from said main chamber, and
   means for withdrawing liquid from said reservoir.

8. A method for determining the concentration of effluent in an effluent-bearing gas comprising:
   providing a generally spherical main chamber and a reservoir,
   introducing said gas to said generally spherical main chamber having a volume of about 50 to 1000 ml, through an inlet in said main chamber at a rate about 0.03 to 0.3 ft.$^3$/min.,
   providing a liquid to at least one of said main chamber and said reservoir at a rate of about 0.5 to 3 ml/min.,
   introducing vaporized liquid from said reservoir to said main chamber through a conduit whose outlet is located adjacent said gas inlet so that said gas draws said liquid through said conduit into said gas whereby said liquid is vaporized in said gas thereby contacting said gas to remove effluent,
   removing said contacted gas at a rate commensurate with the rate of introducing,
   removing said condensing vaporized liquid from said main chamber to said reservoir,
   withdrawing said condensed liquid from said reservoir to an analyzer.

* * * * *